UNITED STATES PATENT OFFICE.

BENJAMIN W. ELDER, OF LOS ANGELES, CALIFORNIA, ASSIGNOR TO THE ALLBRIGHT-NELL COMPANY, A CORPORATION OF ILLINOIS.

PROCESS FOR HYDROGENATION.

1,331,905.  Specification of Letters Patent.  Patented Feb. 24, 1920.

No Drawing.  Application filed June 7, 1918. Serial No. 238,656.

*To all whom it may concern:*

Be it known that I, BENJAMIN W. ELDER, a citizen of the United States, and a resident of the city of Los Angeles, in the county of Los Angeles and State of California, have invented certain new and useful Improvements in Processes for Hydrogenation; and I do hereby declare that the following is a full, clear, and exact description of the same.

This invention relates to the catalytic hydrogenation of unsaturated liquids, and more particularly to the catalytic hydrogenation of fatty oils, such as the unsaturated fatty acids and their glycerids or esters.

The invention is based upon the discovery that nickel, in bulk form, which possesses practically no catalytic activity, can be converted into a finely pulverulent nickel catalyzer which is highly catalytic, by subjecting the bulk nickel to a mechanical grinding or attrition or abrading operation which will convert the bulk nickel into minute particles of exceeding fineness which can be readily maintained in suspension in the liquid to be hydrogenated; and upon the further discovery that the resulting finely pulverulent nickel catalyzer is of a character and possesses properties adapting it particularly for use in the catalytic hydrogenation of fatty oils.

The catalytic hydrogenation of fatty oils, as commonly practised heretofore, has involved the utilization of finely-divided nickel catalyzers produced by chemical processes. The common practice of producing such catalyzers has been to obtain or produce nickel oxid, or other reducible nickel compound, for example, by dissolving metallic nickel in an acid and obtaining the reducible nickel compound from the resulting solution, and to reduce such compound with hydrogen at an elevated temperature in order to produce a finely-divided catalyzer of characteristic composition and properties.

Catalyzers so produced are usually of an extremely sensitive and pyrophoric character, and require the observation of special conditions for their production, such as purity of re-agents, reduction of the nickel compounds at certain more or less definite temperatures, and protection of the resulting sensitive, and usually pyrophoric, catalyzers from contact with the air or oxidizing gases. The catalyzers thus produced, moreover, have a characteristic structure and composition, due to the method of their production.

According to the present invention, the hydrogenation process is carried out with the aid of finely pulverulent nickel catalyzers produced directly from substantially non-catalytic nickel, by mechanical operations, which convert the nickel into a finely pulverulent state, approaching a state of colloidal fineness, and which develop therein the desired catalytic activity. The catalyzers produced from bulk nickel, that is, relatively large masses of nickel such as nickel shot, nickel lumps, turnings, clippings, etc., are essentially metallic in character, and substantially free from oxygen and from oxids which are always present in catalyzers produced by the incomplete reduction with hydrogen at elevated temperatures of nickel oxid or similar reducible nickel compounds.

So, also, in the preferred embodiment of the invention, the catalyzer employed is of a composite character and is made up of an intimate mixture of the finely pulverulent nickel particles and of a finely divided abrasive. This composite catalyzer may be produced, for example, by subjecting nickel in lump, shot, or other like bulk form, to the action of a suitable finely-divided abrasive appropriately applied. Thus, for instance, nickel shot or grain nickel, together with a finely-divided abrasive, may be introduced into a pebble mill or ball mill, and subjected to abrasion or attrition during the operation of the mill, with the resulting gradual and progressive conversion of the bulk nickel into the form of minute or finely pulverulent nickel particles, in admixture with the finely-divided abrasive. The abrasive may, for example, be such a material as silica, quartz, alundum, emery, carborundum, etc., of a fineness which will pass a 200 mesh sieve. The finely-divided abrasive should be free from anti-catalytic properties and from constituents prejudicial to the desired catalytic activity.

The production of the catalyzer may also, with added advantage in many cases, be effected in the presence of a protective liquid, for example, a fatty oil such as the fatty oil to be hydrogenated, so that there will be produced directly, from the bulk nickel, a finely pulverulent nickel catalyzer in suspension in the fatty oil. When the oil is present, the minute catalyzer particles, as they are produced, will be picked up and enveloped by the oil and maintained in suspension therein. They will, also, be further subjected to further attrition or abrasion during the further continuation of the process. The product produced will be in the form of a more or less thick mud containing either the finely pulverulent nickel, or the minute nickel particles admixed with the finely divided abrasive, in suspension in the oil.

The finely divided catalyzer thus produced goes into suspension in oil very easily and settles out very slowly. It can readily be maintained in suspension in the oil for considerable periods of time; and hence is particularly well adapted for use in the catalytic hydrogenation of oils where the catalyzer is to be maintained in suspension therein. An examination of certain specimens of the catalyzer under the microscope showed the irregular transparent quartz particles (the abrasive) of relatively large size, and the smaller nickel particles, the appearance of many of which was angular, rather than rounded, and some of which showed straight line edges partaking of the nature of the original crystals existing in the nickel shot from which the catalyzer was produced. The smallest nickel particles were too small (approaching colloidal size) to enable their outline to be definitely ascertained with the microscope employed. The particles appeared dull black and did not exhibit any appreciable metallic luster, thus indicating a rough surface. The abrasive, for example, silica, in certain specimens examined, was of coarser size than the nickel particles, and tended to settle out more rapidly, although of much lower specific gravity.

According to the present invention, advantage is taken of the improved catalyzer above described, and of the characteristic composition and properties thereof, in the hydrogenation of fatty oils and similar unsaturated liquids. The improved catalyzer, although produced mechanically from substantially non-catalytic bulk nickel, is, nevertheless, so highly catalytic, and with particles so minute and of such exceeding fineness, that the catalyzer can advantageously replace the catalyzers heretofore commonly used in the catalytic hydrogenation of fatty oils and the like.

It will be evident that various kinds and types of apparatus are available for effecting the catalytic hydrogenation of the oils, or other liquids, and for securing the necessary intimacy of intermixture between the finely pulverulent catalyzer, the liquid oil and the hydrogen. The finely pulverulent catalyzer, either with or without the finely divided abrasive admixed therewith, and produced either with or without the presence of a protective liquid, may thus be formed into a bed or filter, and the oil and hydrogen forced therethrough, at the hydrogenation temperature. The presence of the abrasive is not prejudicial but may even be advantageous in promoting the catalytic activity and in enabling the proper handling of the catalyzer itself.

So, also, the necessary intimacy of intermixture may be brought about in various other ways, as by causing hydrogen gas to bubble through a body of oil containing the catalyzer in suspension therein; or the operation may be promoted by mechanical agitation, for example, by bringing the mixture of oil and catalyzer into an overlying atmosphere of hydrogen gas, in the form of films or sprays, etc. The catalytic hydrogenation can be carried out with advantage, for example, at temperatures around 150–200°.

Because of the finely pulverulent condition of the catalyzer and the characteristic composition and properties of the minute and exceedingly fine particles thereof, the catalyzer is particularly well adapted to be maintained in suspension in the fatty oil, with resulting advantage to the catalytic hydrogenation thereof. Nevertheless, the catalyzer can be readily removed from the oil by filtration; and this operation will be promoted by the finely divided abrasive, when present, and particularly when present in considerable amount.

The process of the present invention can, in many instances, be practised with added advantage by producing the finely pulverulent nickel catalyzer in the presence of the fatty oil or other liquid to be hydrogenated and in direct suspension therein, and by carrying out the hydrogenation with the catalyzer thus produced, so that the minute catalyzer particles will be not only produced within the liquid, but will be conserved and maintained therein, until they have subserved their intended catalytic function in the catalytic hydrogenation process. Thus, for example, the finely pulverulent nickel catalyzer, admixed with the finely divided abrasive, may be produced by a ball mill operation, in the presence of oil, as above described, in the form of a more or less thick mud, and added to the larger body of oil to be hydrogenated, and the hydrogenation thereof thereupon effected. In this way, the catalyzer can be readily incorporated with and maintained in suspension in the oil, and the same oil which served to envelop and pick up and carry the minute catalyzer particles as produced can be subsequently hydrogenated therewith.

When the finely pulverulent catalyzer is produced in the presence of other protective liquid than the oil to be hydrogenated, it may be similarly incorporated with such oil, in case the liquid is of a suitable character, or the liquid can be removed from the catalyzer after its production, and prior to the hydrogenation.

When the catalyzer is produced in a dry state, as by abrasion, in admixture with the abrasive, it may similarly be added to the oil and maintained in suspension therein during the hydrogenation thereof. The advantages incident to the presence of the abrasive, if present, will also be obtained, during the catalytic hydrogenation, and in the handling of the composite catalyzer.

In so far as I am aware, it is broadly new to effect the hydrogenation of fatty oils and similar liquids with a finely pulverulent nickel catalyzer produced by mechanical means from substantially non-catalytic bulk nickel by bringing the liquid oil and hydrogen into contact therewith, and the more comprehensive claims appended hereto are intended to have a correspondingly broad signification. In addition, I regard that aspect of the invention as of particular value where the finely pulverulent mechanically produced nickel catalyzer, of composition and properties characteristic of the mechanical operation by which it is produced, is maintained in suspension in the fatty oil or similar liquid, and where the finely pulverulent catalyzer is produced by abrasion and is admixed with the finely divided abrasive, the minute catalyzer particles being of such a degree of fineness, approaching colloidal, as to enable them to be readily maintained in suspension in the fatty oil.

I do not claim herein the improved catalyzer itself, or the method of its production, since these form the subject matter of separate applications, nor do I claim herein specifically the productiton of the catalyzer as by abrasion, in the presence of heated oil and hydrogen, with simultaneous hydrogenation of the oil by the catalyzer thus produced, since this specific procedure likewise forms the subject matter of a separate application; but the claims appended hereto are directed generally to the hydrogenation process carried out with the improved finely pulverulent catalyzer, and more particularly when carried out with the finely divided mechanically produced catalyzer maintained in suspension in the liquid oil, and when the catalyzer employed is produced directly in the oil, or a part thereof, which is subsequently hydrogenated therewith.

The method of effecting the hydrogenation of oils by causing the oils, together with hydrogen, to flow over catalytically active nickel surfaces, having catalytic activity developed therein by mechanical means, and the combined method of effecting the hydrogenation and of producing a finely pulverulent nickel catalyzer by subjecting nickel surfaces to abrasion during the hydrogenation, are claimed in my companion application, Serial No. 238,657.

I claim:

1. The method of effecting the hydrogenation of oils, which comprises bringing the oil, together with hydrogen, into intimate contact with a finely pulverulent nickel catalyzer, produced by mechanical means from substantially non-catalytic bulk nickel, at a temperature appropriate to the catalytic hydrogenation.

2. The method of effecting the hydrogenation of oils, which comprises bringing about intimate contact of hydrogen with the oil, carrying in suspension therein a finely pulverulent nickel catalyzer produced by mechanical means from substantially non-catalytic bulk nickel, at a temperature appropriate to the catalytic hydrogenation.

3. The method of effecting the hydrogenation of oils, which comprises maintaining in suspension therein a finely pulverulent nickel catalyzer produced by abrasion of substantially non-catalytic bulk nickel, and bringing hydrogen into intimate contact with the oil and catalyzer at a temperature appropriate to the catalytic hydrogenation.

4. The method of effecting the hydrogenation of oils, which comprises maintaining in suspension therein a finely pulverulent abraded nickel catalyzer, together with a finely divided abrasive, and bringing hydrogen into intimate contact with the oil and catalyzer at a temperature appropriate to the catalytic hydrogenation.

5. The method of effecting the catalytic hydrogenation of oils, which comprises converting substantially non-catalytic bulk nickel by mechanical means, into a finely pulverulent nickel catalyzer in the presence of the fatty oil, adding the resulting catalyzer and oil to the main body of oil and maintaining the catalyzer in suspension therein, and bringing hydrogen into intimate contact therewith at a temperature appropriate to the catalytic hydrogenation.

6. The method of effecting the catalytic hydrogenation of oils, which comprises abrading substantially non-catalytic bulk nickel with a finely divided abrasive in the presence of oil, and thereby producing a finely pulverulent nickel catalyzer admixed with the abrasive and oil, adding the same to the main body of oil and maintaining the catalyzer in suspension therein, and bringing hydrogen into intimate contact therewith at a temperature appropriate to the catalytic hydrogenation.

In testimony whereof I have hereunto subscribed my name in the presence of two subscribing witnesses.

BENJAMIN W. ELDER.

Witnesses:
A. WIGHTMAN,
F. W. CLAFLIN.